United States Patent [19]

Harnsberger

[11] 4,120,842

[45] Oct. 17, 1978

[54] SAND CONSOLIDATION COMPOSITION

[75] Inventor: Bobby G. Harnsberger, Houston, Tex.

[73] Assignee: Texaco Inc., New York, N.Y.

[21] Appl. No.: 834,099

[22] Filed: Sep. 19, 1977

Related U.S. Application Data

[62] Division of Ser. No. 753,760, Dec. 23, 1976.

[51] Int. Cl.² .......................... B22C 1/22; C08K 5/01; E21B 33/13
[52] U.S. Cl. .............................. 260/33.6 UA; 164/43; 260/33.6 SB; 260/829; 260/DIG. 40; 260/29.6 R; 166/295
[58] Field of Search ................. 164/43; 260/DIG. 40, 260/33.6 UA, 33.6 SB, 829; 166/295

[56] References Cited

U.S. PATENT DOCUMENTS

| | | | |
|---|---|---|---|
| 3,020,609 | 2/1962 | Brown et al. | 164/43 |
| 3,199,590 | 8/1965 | Young | 166/295 |
| 3,393,739 | 7/1968 | Rosenberg | 166/295 |
| 3,404,735 | 10/1968 | Young et al. | 166/295 |
| 3,437,145 | 4/1969 | Johnson et al. | 166/295 |
| 3,548,944 | 12/1970 | Hess | 166/295 |
| 3,662,831 | 5/1972 | Hess | 166/295 |
| 3,734,936 | 5/1973 | Brown et al. | 164/43 |
| 3,743,019 | 7/1973 | Totty | 166/295 |
| 3,759,327 | 9/1973 | Carnes | 166/295 |
| 3,776,311 | 12/1973 | Carnes et al. | 166/295 |

*Primary Examiner*—Ronald W. Griffin
*Attorney, Agent, or Firm*—Thomas H. Whaley; Carl G. Ries; James F. Young

[57] ABSTRACT

Method of and composition for the treatment of unconsolidated sandy formations to stabilize the formation comprising injecting a treating composition consisting essentially of, on a volume basis, 10 to 25% of furfuryl alcohol, 1–4% of a nonionic dispersing surfactant, 1–4% of water, 0.5–1.5% of a silane coupling agent, 1–5% of a catalyst, 5–15% of a low in aromatics petroleum distillate fraction and 47 to 76% of a high in aromatics petroleum fraction, into said sand formation, effecting polymerization of said furfuryl alcohol, and forming a fluid permeable consolidated sand in said formation.

10 Claims, No Drawings

SAND CONSOLIDATION COMPOSITION

This is a division, of application Ser. No. 753,760, filed Dec. 23, 1976.

FIELD OF THE INVENTION

The present invention relates to the treatment of permeable underground formations. More particularly, the present invention relates to a method of treating permeable underground oil and/or gas containing formations to stabilize the sandy portion thereof and to a treating composition useful in the stabilization of incompetent sand containing underground formations.

The recovery of fluids such as gas and/or oil from underground formations has been troublesome in areas wherein the underground formation is composed of one or more incompetent sand containing layers or zones. The sand particles in the incompetent zone and/or layer tend to move or migrate to the well bore during recovery of the formation fluids from the particular zone and/or layer and frequently the moving sand particles block the passageways leading to the well bore. Plugging or materially impairing the flow of the formation fluids toward the borehole results in a loss of these fluids to the producer or so decreases the rate of oil recovery from the well as to cause the well to be shutdown because it is economically unattractive to continue to produce therefrom. An additional adverse factor resulting from the movement of the sand particles toward the well bore is that they are often carried along with the formation fluids to the well bore and passed through the pipes, pumps, etc. being used to recover the formation fluids to the surface with resulting damage to the moving parts thereof as the sand particles are very abrasive.

DESCRIPTION OF THE PRIOR ART

Many attempts have been made heretofore to prevent or decrease the flow of undesirable sand particles from the formation into the production tubing and associated equipment, such as by the placement of sand screens, filters, liners and so forth. These prior attempts have been unsuccessful for a number of reasons among which is that these mechanical devices fail to prevent completely the flow of the formation particles into the production equipment. In addition, these devices interfere with various types of completion and workover operations. In recent years, the industry has attempted to avoid the difficulties encountered in the use of mechanical devices by employing various chemical compositions to effect consolidation of the underground incompetent formations. These methods have generally consisted of injecting into the underground formation polymerizable resinous materials which when subsequently polymerized form permeable barriers in the formation to prevent to the sand particles from movement therethrough. However, this technique of sand consolidation has not met with widespread acceptance because of the inherent difficulties of effecting polymerization of the resinous materials in the formation to a degree sufficient to consolidate these underground formations and yet permitting the unobstructed flow of the desirable formation fluids therethrough. Further, the cost associated with these resin coating methods has been relatively high in comparison with the prior mechanical methods and the time required for resin polymerization is often rather lengthy at low temperatures.

SUMMARY OF THE INVENTION

By the method of the present invention one is able to treat effectively the underground formation to be stabilized in a rapid and efficient manner while minimizing the disadvantage of these prior art methods, both mechanical and chemical.

One object of the present invention is to provide an improved method of treating underground sand containing formations to stabilize the incompetent formation. An additional object is to provide a fluid permeable consolidated formation sand between the loose formation sand and the well bore so as to prevent or to minimize the flow of unconsolidated sand particles therethrough while maximizing the flow of desired fluids and particularly petroleum hydrocarbons therethrough. A still further object is to provide a novel treating composition for use in stabilizing incompetent sand formations and to a method of placing same.

How these and other objects of the invention are accomplished will become apparent with reference to the accompanying disclosure. In at least one embodiment of the method of this invention at least one of the foregoing objects will be obtained.

It has now been discovered that an improved method of treating an incompetent sand containing underground formation comprises introducing into said formation a particular treating composition consisting essentially of, on a volume basis, from about 10 to 25% of furfuryl alcohol, from about 1 to 4% of a surfactant, from about 1 to 4% of water, from about 0.5 to 1.5% of a silane coupling agent, from about 1 to 5% of a catalyst, from about 5 tp 15% by volume of a low in aromatics petroleum distilled fraction and from about 47 to 76% of a high in aromatics petroleum fraction, effecting polymerization of said alcohol in the formation sand to be consolidated. The resultant consolidated sand serves to prevent or to reduce materially the flow of the unconsolidated sandy particles therethrough while permitting the flow of desirable formation fluids at a substantially unimpaired rate.

In carrying out the method of the present invention it is necessary to first remove any water present in the tubing and casing around the area to be treated since excess water might cause the treating composition to separate. This may normally be carried out by use of a spacer of diesel oil or other hydrocarbon. Thereafter the treating composition is pumped down the well bore under sufficient pressure to force the composition into the unconsolidated formation adjacent to or in reasonable proximity to the well bore. When the composition is suitably placed in the formation the well is shut in for the time required to effect polymerization of the alcohol component by the catalyst component under the elevated temperature of the formation.

On polymerization the furfuryl alcohol component of the composition sets up and hardens and there is formed a fluid permeable consolidated sand that prevents or decreases the movement of sand particles therethrough into the well bore. After the alcohol polymerizes and hardens, the well can be equipped for production. The formation fluids can be recovered therefrom by permitting these fluids to pass through the resulting formed consolidated sand in the formation into the well bore and recovered therefrom without the formation fluids being contaminated with the presence therein of unconsolidated sand particles.

The method of the present invention is particularly adaptable for use in any type of well completion but is generally used in a well wherein casing has been set and which has perforations therein at the desired intervals behind which the unconsolidated formation sands are located. Packers can be initially set above and below the perforated intervals to prevent the treating composition from passing into the non-isolated portions of the well and also to permit build-up of sufficient pressures on the said composition to force same through the performations and into the formation without plugging up the well bore. After the treating composition has been forced through the casing performations and into the unconsolidated dry sand formation the well is usually closed in for a suitable period of time to permit the catalyzed alcohol to set and harden.

The treating composition useful in the method of the present invention must meet certain specific requirements. The concentration of furfuryl alcohol present in the treating composition can vary from about 10 to about 25% by volume, with excellent results being obtained at concentrations of between 15 and 20%, and particularly at about 18-19% for the most effective results. Amounts above about 25% of the alcohol are to be avoided because the solution is unstable and may separate. Alcohol concentrations below about 10% are not desirable because the consolidation is apt to be weak in compressive strength.

One of the essential components of the treating composition is a nonionic surface active dispersing agent which is used in an amount of from about 1 to about 4% by volume, and preferably about 2-3% by volume. This component serves to disperse the water soluble components of the composition in the oil components. Suitable surface active dispersing agents include Pluronic L-64, a polyoxypropylene-polyoxyethylene condensate obtained by the condensation of propylene oxide with propylene glycol and the addition of ethylene oxide to both ends of the polyoxypropylene base. This material has a hydrophilic lipophilic balance of 15.0 and an average molecular weight of about 2900.

Another suitable oil soluble surface active agent is the nonionic surfactant known by the trade name Hyflo, and described more fully in U.S. Pat. No. 2,946,747, as an oil soluble amine salt of an alkylated aromatic sulfonic acid and a polyether synergizing component capable of reducing the surface tension of water by at least 25 dynes/cm$^2$ and having an average M.W. of at least 1200 attributable to oxyalkylene groups having 2 to 4 carbon atoms, the relative proportion of the salt being 3 to 20 times by weight of the synergizing component.

The nonionic dispersing surfactant known by the trade name Polycomplex Q, can also be used.

Another essential component of the composition is from about 1 to 4% by volume of water, and preferably about 2 to 3%. This component reacts with the acid chloride catalyst component to form hydrochloric acid, which in turn polymerizes the alcohol component.

Another component of the composition is the silane coupling agent, which is used to impart additional strength to the consolidated sand formation. It functions to improve surface adhesion of the alcohol to the sand grains, thus improving the compressive strength thereof. While any of the known silane coupling or bonding agents can be used, it is preferred to employ a particular silane, namely gamma-glycidoxypropul—trimethoxysilane in the composition. A suitable quantity thereof may vary from about 0.5 to about 1.5% by volume, preferably from about 0.7 to 1.3%.

A suitable catalyst component of the composition must function to effect polymerization of the furfuryl alcohol after placement in the sand formation being consolidated.

Representative catalysts such as organic acid halides like methanesulfonyl chloride, benzoyl chloride and benzenesulfonyl chloride can be used. The expecially preferred catalysts are benzoyl chloride and benzenesulfonyl chloride. Any of these catalysts, alone or in admixture are satisfactory, and can be used at concentrations of from about 1 to 5% by volume, preferably 1.5 to 3.5%, for most satisfactory results.

The solvent components should be of the type to effect solubilization or dispersion of the furfuryl alcohol and remaining components therein.

It has been found necessary to employ a mixture of solvents for the composition of the present invention.

One solvent component is a high in aromatics, (80% or more), petroleum fraction obtained as naphthalene petroleum fraction from a topped catalytic bottoms fraction having an IBP of about 350° F. and an EP of about 750° F., an API Gravity of about 20° C., and a Flash Point of above about 150° F. (COC).

This high in aromatics fraction is used in an amount of from about 47 to 76% by volume, preferably from about 55 to about 75%.

The other solvent component can be a low in aromatics (20% or less) petroleum distillate fraction such as a kerosene fraction or a diesel oil fraction having a cetane no. of at least 45 and a boiling range of from about 310° F. to about 540° F., an API Gravity of 41° to 47° C. and a Flash Point of at least 120° F., (COC).

This petroleum distillate fraction is employed at a concentration of from about 5 to 15% by volume, preferably from about 8 to 12%.

It is to be noted that at ambient temperatures the treating composition is relatively stable (the furfuryl alcohol component will not polymerize to an objectionable degree even in the presence of the catalyst component) for a period of time sufficient to permit preparation of the composition and its placement in the formation. On placement in the formation, the formation temperature along with the catalyst component is sufficient to effect polymerization of the furfuryl alcohol component with resultant consolidation of the formation. Typical formation temperatures effective to permit polymerization within about 24 hours are in the range of from about 100° F. up to 300° F., usually from about 100° F. to about 250° F.

In the practice of this invention the formation to be consolidated can be essentially waterfree or dry. Drying of a water wet formation can be accomplished in a known manner such as by displacement with an organic solvent for water such as acetone, 2-propanol, dioxane and the like. An essential characteristic of this organic solvent is that it be non-reactive with the catalyst component. While the treating composition can be used in wet sands there is some loss in compressive strength.

The treating composition of the present invention is employed in the following manner.

After drying the formation, if necessary, the treating composition is introduced into the bore hole and then displaced into the formation to be consolidated. Suitable displacement fluids for the treating solution include the solvent component of the solution itself or other similar products.

Rates of injection of the treating solution may vary from about one to about three gallons per minute per perforation. An injection rate of from about 1.5 to 2.5 gallons is preferred.

Following is a description by way of example of the method of the present invention.

EXAMPLE 1

A one inch in diameter by 6 inches long glass tube was filled with a dry Oklahoma #1 sand having a known permeability of about 13 darcies.

The sand was packed in the tube dry by vibration. The packed sand was treated with 40 ml. of the treating solution of the invention. The treating solution was composed of 80 ml. of furfuryl alcohol, 8 ml. of non-ionic dispersing agent, Polycomplex Q, 8 ml. of water, 4 ml. of gammaglycidoxypropyl — trimethoxysilane, 10 ml. of benzene sulfonyl chloride catalyst, 40 ml. of a essentially low in aromatics petroleum solvent having an API Gravity of 41°–47° C., a Flash Point (COC) of 120° F. minimum, and a boiling range of 310°–540° F., and 280 ml. of a high in aromatics petroleum distillate solvent having an API Gravity of 20° C., max., a boiling point range of 350°–750° F., and a Flash Point (COC) of a minimum of 150° F., and being a naphthalene petroleum fraction of a topped catalytic reformate bottoms cut. The treated sand packed tube was heated at 80° C. overnight.

Thereafter the consolidated sand was removed from the tube and compressive strength and permeability measurements were obtained. The consolidated sand showed compressive strengths of 500–2300 psi. Its stability to flowing oil, brine and mixtures in three separate tests, conducted at 200° F., flow rates of 200 ml/min., through 1 in. diameter by 1 in. long samples of consolidated sands by the compositions of the invention was found to be comparable to that of commercial sand consolidation compositions.

EXAMPLES 2–3

Similar results to those of Example 1 were obtained using the dispersants Hyflo and Pluronic L-64 in place of Polycomplex Q.

Obviously, many modifications and variations of the invention as hereinbefore set forth may be made without departing from the spirit and scope thereof and therefore only such limitations should be imposed as are indicated in the appended claims.

I claim:

1. A treating composition for use in forming a fluid permeable barrier film in a sand containing, unconsolidated oil producing formation which consists essentially of, on a volume basis, 10 to 25% of furfuryl alcohol, 1 to 4% of a nonionic dispersing surfactant, 1 to 4% of water, 0.5 to 1.5% of a silane bonding agent, 1 to 5% of a polymerization catalyst for said furfuryl alcohol, 5 to 15% of a low-in-aromatics (about 20% maximum) petroleum distillate fraction, and from about 47 to about 76% of a high-in-aromatics (above about 80%) petroleum fraction.

2. Composition as claimed in claim 1 wherein said furfuryl alcohol concentration is from 15 to 20%.

3. Composition as claimed in claim 1 wherein said alcohol concentratiion is from 18–19%.

4. Composition as claimed in claim 1 wherein said nonionic dispersing surfactant is obtained by the condensation of propylene oxide with propylene glycol and the addition to both ends of the polyoxpropylene base of ethylene oxide, and wherein the Hydrophilic - Lipophilic Balance is 15.0 and the M.W. is about 2900, and is present in an amount of from 2 to 3%.

5. Composition as claimed in claim 1 wherein the water concentration is 2–3%.

6. Composition as claimed in claim 1 wherein said silane bonding agent is present in an amount of from 0.7 to 1.3%.

7. Composition as claimed in claim 1 wherein said silane bonding agent is gamma glycidoxypropyl - trimethoxysilane.

8. Composition as claimed in claim 1 wherein said furfuryl alcohol polymerization catalyst is present in an amount of from about 1.5 to 3.5%.

9. Composition as claimed in claim 1 wherein said low-in-aromatics petroleum distillate fraction is present in an amount of from about 8 to 12%.

10. Composition as claimed in claim 1 wherein said high-in-aromatics petroleum fraction is present in an amount of from 55 to 75%.

* * * * *